United States Patent [19]

Masuda et al.

[11] 4,405,866
[45] Sep. 20, 1983

[54] WAVE-POWER GENERATOR ASSEMBLY

[75] Inventors: Yoshio Masuda, Yokosuka; Takeaki Miyazaki, Yokohama; Osamu Yamada, Kawasaki; Akira Hiramoto, Kamakura, all of Japan

[73] Assignees: Japan Marine Science; Technology Center; Fuji Electric Company, Ltd., all of Japan

[21] Appl. No.: 310,290

[22] Filed: Oct. 9, 1981

[30] Foreign Application Priority Data

Oct. 18, 1980 [JP] Japan .................. 55-145069

[51] Int. Cl.³ .............................. F03B 13/12
[52] U.S. Cl. ............................ 290/53; 60/502; 417/330
[58] Field of Search .............. 60/398, 497, 502; 417/100, 330, 331, 337; 290/42, 53

[56] References Cited

U.S. PATENT DOCUMENTS

| 875,912 | 1/1908 | Heymann | 415/101 |
| 2,179,537 | 11/1939 | Zoppa | 290/42 |
| 4,313,711 | 2/1982 | Lee | 415/7 |

Primary Examiner—J. V. Truhe
Assistant Examiner—Shelley Wade
Attorney, Agent, or Firm—Guy W. Shoup; Eliot S. Gerber

[57] ABSTRACT

A wave-power generator assembly including a pair of one-way turbines symmetrically mounted on a common rotating shaft is provided. Because of the symmetrical arrangement of the one-way turbines, the rotating shaft and, therefore, bearings to rotatably support the rotating shaft are prevented from receiving excessive thrust forces. Thus, the present generator assembly may be presented to service for an extended period of time without requiring replacement of parts.

4 Claims, 5 Drawing Figures an electric generator driven by an air flow and more in particular to a wave-power generator assembly which is driven by an air flow caused by the oceanic wave motion.

WAVE-POWER GENERATOR ASSEMBLY

BACKGROUND OF THE INVENTION

1. Field of the Invention

This invention relates to an electric generator driven by an air flow and more in particular to a wave-power generator assembly which is driven by an air flow caused by the oceanic wave motion.

2. Description of the Prior Art

Wave-power generator assemblies are well known in the art. Early wave-power generator assemblies were generally comprised of a generator, a turbine mounted on the rotating shaft of the generator, an air chamber enclosing a volume of air with its bottom defined by the water surface, and a flap valve for regulating the direction of the air flow which is caused by the motion of the water surface inside the air chamber and which is to be supplied to the turbine. Such prior art wave-power generator assemblies were disadvantageous because they required the use of one-way valves such as flap valves and the valves had to be replaced quite often because of rapid wear. They were also disadvantageous from an efficiency viewpoint since they only used either one aspect of up and down motion of the wave in generating electricity.

There was proposed another prior art wave-power generator assembly including a turbine which may be rotated in the same direction irrespective of the direction of the air flow passing across the turbine blades. Such a wave-power generator assembly having a one-way turbine is disclosed, for example, in the U.K. patent application, No. 47365/76, filed Nov. 11, 1977. In this prior art device, since the turbine may be rotated in the same predetermined direction even if the direction of an air flow passing across the turbine blades is reversed, no provision of one-way valves is required and the up and down motion of the wave can be effectively converted into rotary mechanical power as a driving power of an electric generator. However, such a prior art generator assembly having a one-way turbine was not free of disadvantages and further refinement and improvement have been called for in obtaining satisfactory results.

SUMMARY OF THE INVENTION

The disadvantages of the prior art are overcome with the present invention and an improved wave-power generator assembly for producing electricity from the energy of the water wave is provided.

The advantages of the present invention are preferably attained by providing a pair of one-way turbines symmetrically mounted on a common rotating shaft, bearing means for rotatably supporting the common rotating shaft, an air passage for supplying air flows opposite in direction to the respective one-way turbines, and a generator which is driven by the common rotating shaft. Here, the terminology "one-way turbine" is used to imply a turbine which is structured to rotate in the same predetermined direction even if the air flow passing across the turbine blades is reversed. One example of the one-way turbine includes a plurality of symmetrical, airfoil-shaped blades which extend in the radial direction with respect to the rotating axis of the rotating shaft. And, the zero-lift plane of the blades is perpendicular to the plane which includes the rotating axis of the rotating shaft.

In accordance with the present invention, since a pair of one-way turbines is symmetrically mounted on a common rotating shaft and air flows of opposite directions are applied to the respective turbines, thrust forces imparted to the rotating shaft are balanced and the bearing for rotatably supporting the rotating shaft is prevented from receiving excessive thrust forces.

Preferably, the present wave-power generator assembly comprises an air chamber defined by a wall member with its bottom portion dipping into the water first duct means for fluiddynamically connecting the air chamber to the open air through one of the one-way turbines, second duct means for fluiddynamically connecting the air chamber to the open air through the other one-way turbine, whereby the up and down motiono of the water surface inside the air chamber causes to direct air flows opposite in direction through the respective one-way turbines.

In accordance with another embodiment of the present invention, a plurality of paired one-way turbines, which are commonly connected, are provided to assure smoother operating performance. In this second embodiment, it is preferable that the air chamber is sectioned into a plurality of compartments, each corresponding to an individual pair of the one-way turbines.

Therefore, it is an object of the present invention to provide an improved wave-power generator assembly.

Another object of the present invention is to provide a durable wave-power generator assembly which is capable of offering an extended period of servicelife without requiring replacement of parts.

A further object of the present invention is to provide a wave-power generator assembly which is high in efficiency in converting the energy of the wave into rotary mechanical power as a driving source of an electric generator.

A still further object of the present invention is to provide a wave-power generator assembly which is simple in structure and, therefore, easy to manufacture.

Other objects, advantages and novel features of the present invention will become apparent from the following detailed description of the invention when considered in conjunction with the accompanying drawings.

DESCRIPTION OF THE PREFERRED EMBODIMENTS

Figure 1:
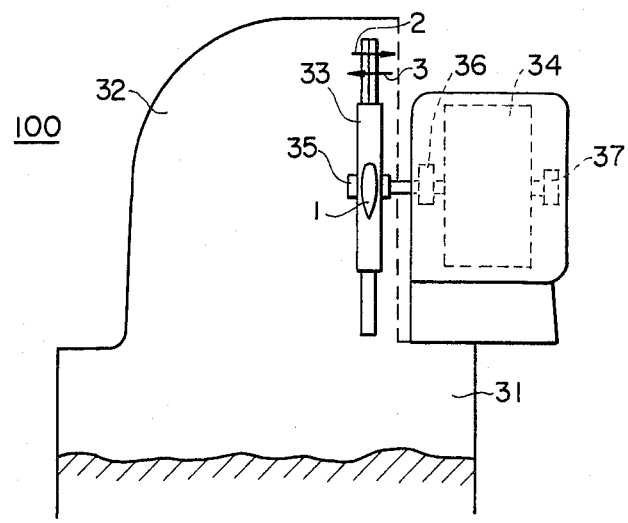
FIG. 1 is a schematic illustration showing the structure of a wave-power generator assembly when a single one-way turbine is provided.

Referring now to FIG. 1, there is shown a wave-power generator assembly 100 which is provided with a single one-way turbine 33. The assembly 100 includes an air chamber 31 which is defined by a wall member with its bottom portion dipping into the water to confine a volume of air therein. A duct 32 is provided on top of the air chamber 31 as a guide for passing the air flow 2 or 3 produced by the up and down motion of the water surface across the blades of the turbine 33. As shown, the turbine 33 is fixedly mounted on the rotating shaft 35 of an electric generator 34. Usually, the rotating shaft 35 forms a part of an armature that is to be rotated in a magnetic field produced by the field coils of the generator 34 to produce electricity. The rotating shaft 35 is rotatably supported by a pair of bearings 36 and 37.

It is to be noted that the assembly 100 may be fixedly provided or may be floated on the water surface. When the water surface moves up and down inside the air chamber 31, the air inside the chamber 31 is caused to flow into the open air as indicated by the arrow 2 through the duct 32 or the open air is sucked into the air chamber 31 as indicated by the arrow 3 through the duct 32. Thus, the direction of the air flow passing through the turbine 33 is reversed as the motion of the water surface inside the air chamber 31 changes its direction, i.e., up or down. However, the one-way turbine 33 is driven to rotate in the same and predetermined direction even if the air flow passing across the turbine blades is reversed due to its particular structure.

Figure 2:
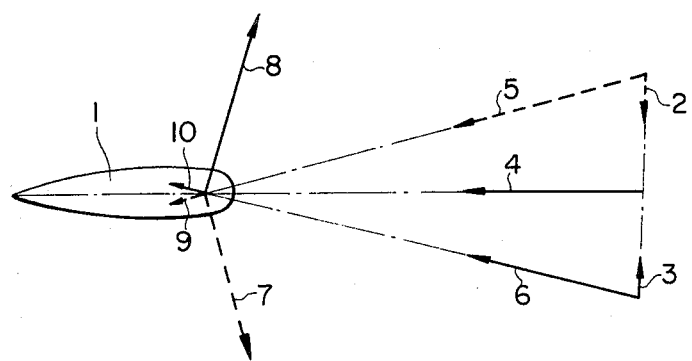
FIGS. 2 and 3 are schematic illustrations showing components of the aerodynamic force acting on the blade of the one-way turbine shown in FIG. 1.
Figure 3:
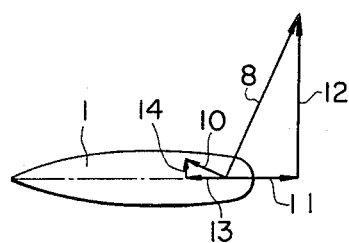

The principle of the one-way turbine 33 will be described more in detail hereinbelow with particular reference to FIGS. 2 and 3. The main feature of the one-way turbine 33 resides in the structure of a turbine blade 1, a plurality of which are provided to extend in the radial direction with respect to the rotating axis of the rotating shaft 35. As best shown in FIGS. 2 and 3, the blade 1 is symmetrical and airfoil-shaped. The blades 1 are mounted such that the zero-lift plane of the blades is perpendicular to the plane including the rotating axis of the rotating shaft 35.

Referring to FIG. 2, if the turbine 33 is in rotation, the air has a velocity component 4 with respect to the blade 1. Thus, if the air flow induced by the ascending motion of the water surface has a velocity component 2, the resultant velocity of the air against the blade 1 is as shown by the arrow 5. As a result of this resultant velocity 5, lift 7 and drag 9 will be exerted on the blade 1. On the other hand, if the air flow induced by the descending motion of the water surface has a velocity component 3, the resultant velocity 6 will be obtained. Under the condition, lift 8 and drag 10 will act on the blade 1.

As shown in FIG. 3, the aerodynamic lift 8 may be broken into a force component 11 in the zero-lift plane of the blade 1 and a force component 12 in the direction perpendicular to the zero-lift plane. The drag 10 may be broken into two force components 13 and 14 in a similar manner. The force components 11 and 13 are pointed in opposite directions and the difference between these two force components will contribute to rotate the turbine 33 normally to the direction of the force component 11. It is to be noted that the other force components 12 and 14 are pointed in the same direction, and they do not contribute to the rotation of the turbine 33 but these force components together will be exerted as an axial thrust force on the bearings which rotatably support the rotating shaft 35 of the turbine 33.

It has been observed that the axial thrust force can become approximately ten times larger than the rotational force when the turbine 33 is running at a reasonable effeciency. More importantly, the axial thrust force reverses its direction when the air flow passing around the blades 1 reverses its direction. It will thus be easily appreciated that the bearings 36 and 37 which support the rotating shaft 35 are subjected to very severe conditions. During our experiments with the assembly 100 shown in FIG. 1, we often observed failure of the bearings. Moreover, difficulty exists in designing proper bearings since the rotational velocity of the turbine 33 is relatively high, ranging between 3,000 and 6,000 rpm.

Figure 4:
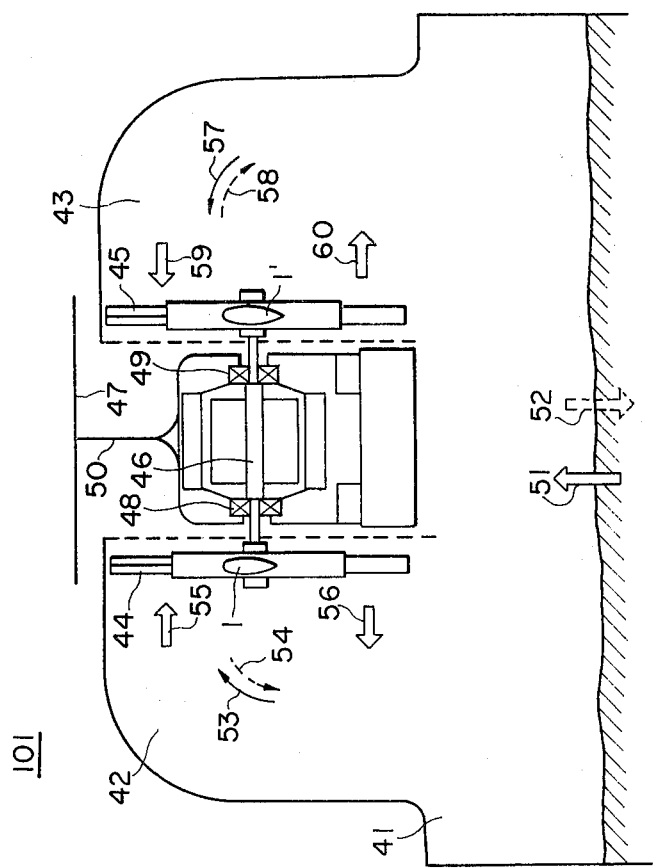
FIG. 4 is a schematic illustration showing one embodiment of the present wave-power generator assembly.

FIG. 4 shows one embodiment of the wave-power generator assembly 101 in accordance with the present invention. As shown, the assembly 101 includes at its bottom an air chamber 41 which is defined by a wall member or housing with its bottom portion dipping into the water to confine a volume of air therein. A pair of ducts 42 and 43 are provided on top of the air chamber 41, and the ducts 42 and 43 are fluiddynamically connected to the air chamber 41 to form an air passage, through which the air inside the chamber 41 is discharged into the open air or the open air is sucked into the chamber 41 depending upon the direction of motion of the water surface.

A pair of one-way turbines 44 and 45, fixedly mounted on a common rotating shaft 46 in the same predetermined direction, is provided such that the respective turbines 44 and 45 are located at their respective duct exits. The rotating shaft 46 forms a part of an electric generator 47, preferably a part of an armature, and it is rotatably supported by a pair of bearings 48 and 49. A center guide plate 50 is provied to guide an air flow between the respective ducts 42, 43 and the open air, thereby avoiding possible creation of eddies.

In operation, when the water surface inside the air chamber 41 moves upward as indicated by the arrow 51, there are produced air flows 53 and 57 in the ducts 42 and 43, respectively. These air flows 53 and 57 will exert the rotational force to rotate the turbines 44 and 45 in the same predetermined direction. At the same time, the air flow 53 will exert an axial thrust force 55 on the rotating shaft 46 and the air flow 57 will exert an axial thrust force 59 on the rotating shaft 46. However, since the thrust forces 55 and 59 are opposite in direction and virtually same in magnitude, they cancel out, thereby the bearings 48 and 49 are prevented from receiving strong thrust forces.

On the other hand, when the water surface inside the air chamber 41 moves downward as indicated by the arrow 52, air flows 54 and 58 are produced in the respective ducts 42 and 43. These air flows 54 and 58, though they are opposite in direction as compared with the previous air flows 53 and 57, also exert the rotational force on the rotating shaft 46 in the same predetermined direction. Under the present circumstances, the air flow 54 will exert an axial thrust force 56 on the rotating shaft 46; whereas, the air flow 58 will exert an axial thrust force 60 on the rotating shaft 46, thereby the thrust forces 56 and 60 cancel each other.

As understood, in accordance with the present invention, the turbines 44 and 45 are kept rotating in the same predetermined direction at all times and, furthermore, thrust forces acting on the rotating shaft 46 are balanced, thereby preventing excessive thrust forces being applied to the bearings. It will be easily understood that the present assembly is most preferable to be structured symmetrical. Besides, the requirements for the bearings are greatly relaxed in the present invention.

Figure 5:
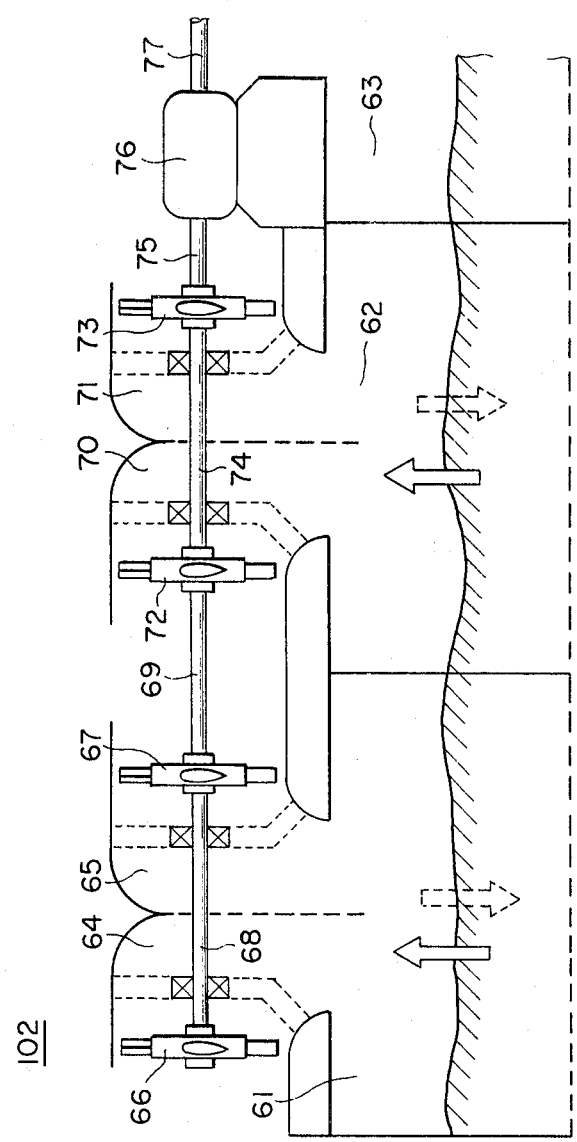
FIG. 5 is a schematic illustration showing another embodiment of the present wave-power generator assembly.

FIG. 5 shows another embodiment of the present invention in which the wave-power generator assembly 102 includes a plurality of paired-turbines. As shown, paired-turbines 66 and 67 are mounted on a common rotating shaft 68, and the turbines 66 and 67 are disposed at the exits of the ducts 64 and 65, respectively, which are fluiddynamically connected to an air compartment 61. Similarly, another pair of turbines 72 and 73 are mounted on a common rotating shaft 74, and the turbines 72 and 73 are located at the exits of the ducts 70 and 71, respectively, which are connected to another air compartment 62. The shafts 68 and 74 are operatively connected by a connecting shaft 69, and the shaft 74 is connected to one end of the rotating shaft 75 of an electric generator.

The assembly 102 shown in FIG. 5 operates substantially in the same manner as the assembly 101 shown in FIG. 4, and, therefore, further explanation as to the operation will be omitted. It should, however, be noted that operation will be smoother and the generating cost per unit power may be reduced in the case of the assembly 102 of FIG. 5. Besides, the number of electric generators 76 to be provided may be minimized.

While the above provides a full and complete disclosure of the preferred embodiments of the present invention, various modificatons, alternate constructions and equivalents may be employed without departing from the true spirit and scope of the invention. Therefore, the above description and illustration should not be construed as limiting the scope of the invention, which is defined by the appended claims.

What is claimed is:

1. A wave-power generator assembly comprising:
   a pair of one-way turbines of the identical structure symmetrically mounted on a common rotating shaft;
   bearing means for rotatably supporting said common rotating shaft;
   a generator driven to generate electricity by said common rotating shaft;
   an air chamber with its bottom opened toward and into the water surface; and
   air passage means including first duct means for fluiddynamically connecting said air chamber to the open air through one of said one-way turbines and second duct means for fluiddynamically connecting said air chamber to the open air through the other one-way turbine, whereby the up and down motion of the water surface inside said air chamber causes to direct air flows opposite in direction through said respective one-way turbines in an alternating manner so that the common rotating shaft is driven to rotate in a predetermined direction at all times irrespective of the direction of the air flows through said first and second duct means.

2. The generator assembly of claim 1 wherein each of said one-way turbines includes a plurality of symmetrical, airfoil-shaped blades extending in the radial direction with respect to the rotating axis of said common rotating shaft, and the zero-lift plane of said blades is perpendicular to the plane which includes the rotating axis of said common rotating shaft.

3. The generator assembly of claim 1 wherein a plurality of said paired, one-way turbines are provided, and further comprising means for operatively connecting the adjacent two pairs of one-way turbines.

4. The generator assembly of claim 3 wherein said air chamber is sectioned into a plurality of compartments, each corresponding to an individual pair of said plurality of paired, one-way turbines.

* * * * *

UNITED STATES PATENT AND TRADEMARK OFFICE
CERTIFICATE OF CORRECTION

PATENT NO. : 4,405,866
DATED : September 20, 1983
INVENTOR(S) : YOSHIO MASUDA, TAKEAKI MIYAZAKI, OSAMU YAMADA and AKIRA HIRAMOTO It is certified that error appears in the above—identified patent and that said Letters Patent is hereby corrected as shown below:

On the title page

Correct the Assignees names as follows:

-- Assignees: Japan Marine Science and Technology Center;

Fuji Electric Company, Ltd. --

Signed and Sealed this

Fifth Day of June 1984

[SEAL]

Attest:

GERALD J. MOSSINGHOFF

Attesting Officer     Commissioner of Patents and Trademarks